United States Patent
Stenzel

(10) Patent No.: US 8,115,132 B2
(45) Date of Patent: Feb. 14, 2012

(54) HEAVY-DUTY CIRCUIT BREAKER WITH A HOUSING

(75) Inventor: Peter Stenzel, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 496 days.

(21) Appl. No.: 12/306,819

(22) PCT Filed: Jun. 21, 2007

(86) PCT No.: PCT/EP2007/056216
§ 371 (c)(1),
(2), (4) Date: Dec. 29, 2008

(87) PCT Pub. No.: WO2008/000691
PCT Pub. Date: Jan. 3, 2008

(65) Prior Publication Data
US 2009/0194403 A1 Aug. 6, 2009

(30) Foreign Application Priority Data
Jun. 30, 2006 (DE) .......................... 10 2006 031 219

(51) Int. Cl.
*H01H 33/88* (2006.01)
(52) U.S. Cl. ............................. 218/59; 218/7; 218/113
(58) Field of Classification Search .............. 218/20–21, 218/32, 113, 7, 59
See application file for complete search history.

(56) References Cited

U.S. PATENT DOCUMENTS

| | | | |
|---|---|---|---|
| 3,745,282 A | 7/1973 | Dides | |
| 4,016,382 A | 4/1977 | Roth | |
| 4,440,998 A | 4/1984 | McConnell et al. | |
| 4,510,359 A * | 4/1985 | de Calvino y Teijeiro | ... 218/143 |
| 5,216,214 A * | 6/1993 | Willieme et al. | ............... 218/62 |
| 5,780,799 A * | 7/1998 | David | .............................. 218/57 |
| 5,905,243 A | 5/1999 | Zehnder et al. | |
| 6,127,641 A * | 10/2000 | Meinherz | ......................... 218/43 |
| 6,291,786 B1 | 9/2001 | Gericke et al. | |
| 6,515,248 B2 * | 2/2003 | Imamura et al. | ................. 218/59 |
| 7,250,583 B2 * | 7/2007 | Cameroni et al. | ................. 218/7 |
| 7,511,243 B2 * | 3/2009 | Laskowski et al. | ............... 218/7 |
| 7,595,461 B2 * | 9/2009 | Saxl et al. | ........................ 218/59 |

FOREIGN PATENT DOCUMENTS

| | | |
|---|---|---|
| CN | 1691445 A | 11/2005 |
| DE | 2038338 A1 | 7/1971 |
| DE | 2427451 A1 | 5/1975 |
| DE | 3318229 A1 | 1/1984 |
| DE | 29614799 U1 | 10/1996 |
| DE | 19641550 A1 | 4/1998 |
| DE | 19856775 A1 | 6/2000 |
| DE | 10119530 A1 | 11/2002 |
| EP | 1589625 A1 | 10/2005 |

* cited by examiner

*Primary Examiner* — Truc Nguyen
(74) *Attorney, Agent, or Firm* — Laurence A. Greenberg; Werner H. Stemer; Ralph E. Locher

(57) ABSTRACT

A heavy-duty circuit breaker has a housing with a longitudinal housing axis and a contact arrangement disposed in the housing. The contact arrangement is conductively connected to a first electrical lead fed through the housing and a second electrical lead fed through the housing. The housing comprises a first housing part and a second housing part. The first electrical lead is fed through the first housing part, and the second electrical lead through the second housing part. The two housing parts are connected together so as to be rotatable in opposite directions about the longitudinal housing axis.

12 Claims, 1 Drawing Sheet

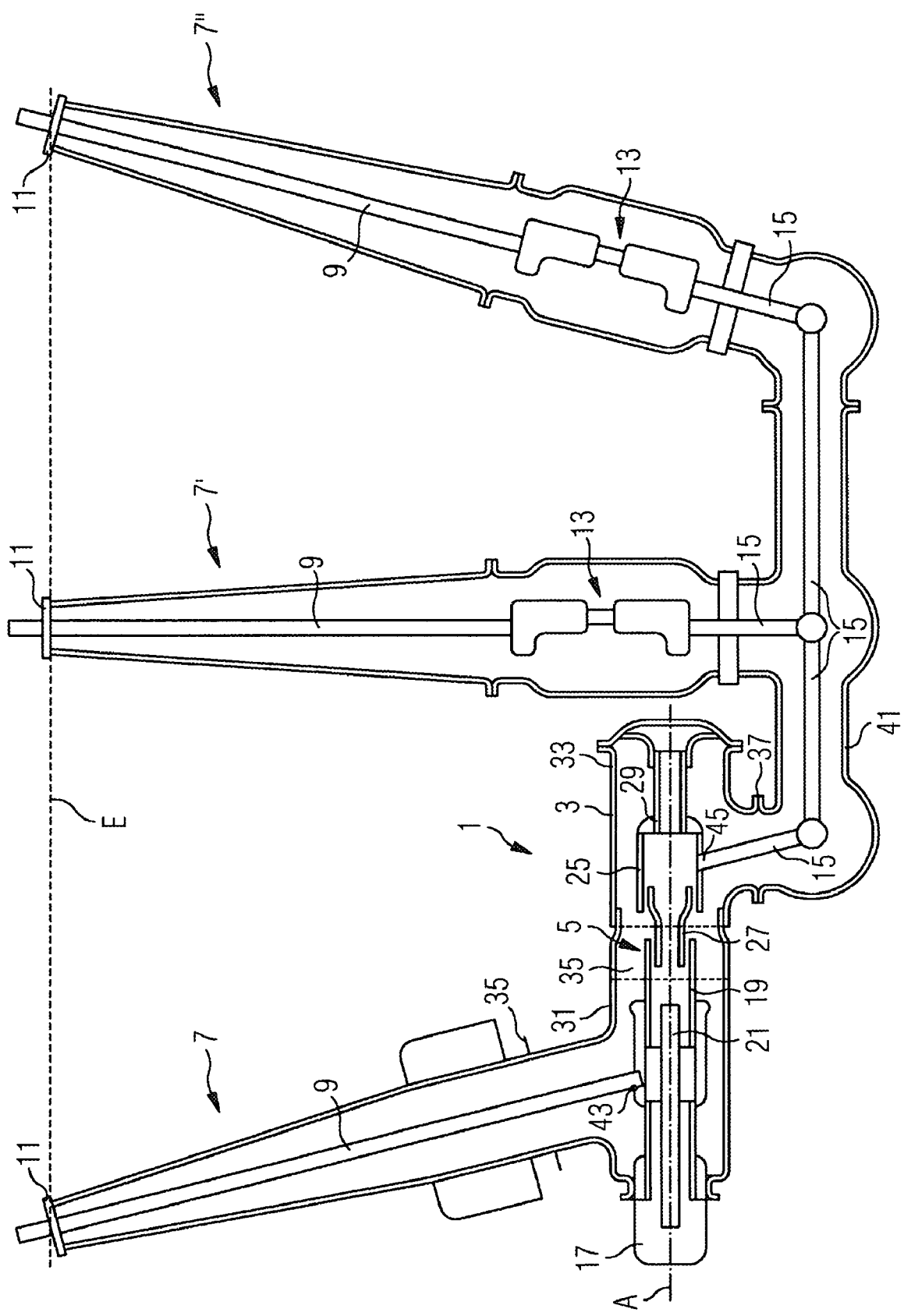

HEAVY-DUTY CIRCUIT BREAKER WITH A HOUSING

BACKGROUND OF THE INVENTION

Field of the Invention

The present invention relates to a heavy-duty circuit breaker with a housing and a contact arrangement arranged in the housing.

Such a circuit breaker is disclosed, for example, in DE 101 19 530 A1. The high-voltage circuit breaker described therein has an encapsulation housing which is provided with at least two connecting flanges via which further encapsulation modules can be connected to the encapsulation housing. Due to the arrangement of the connecting flanges, encapsulated high-voltage heavy-duty circuit breakers can be variably combined with one another.

BRIEF SUMMARY OF THE INVENTION

It is the object of the present invention to provide a high-voltage heavy-duty circuit breaker with a housing which can be used in a particularly variable manner.

This object is achieved by a heavy-duty circuit breaker as recited in the claims. The dependent claims contain advantageous embodiments of the heavy-duty circuit breaker according to the invention.

A heavy-duty circuit breaker according to the invention is equipped with a housing which has a longitudinal housing axis. In the housing, a contact arrangement is arranged which is conductively connected to a first electrical lead fed through the housing and a second electrical lead fed through the housing. The housing has a first housing part and a second housing part, the first electrical lead being fed through the first housing part and the second electrical lead being fed through the second housing part. The two housing parts are connected to one another so as to be rotatable with respect to one another about the longitudinal housing axis.

By rotating the two housing parts, the orientation of the electrical leads fed through the housing parts can be changed relative to one another. As a result, the housing can be advantageously used since it can be optimally adapted to the geometric situations at the installation site by rotating the housing parts. In particular, a space-saving arrangement of the electrical leads fed through the housing can be implemented by suitable rotation, particularly if the electrical leads fed through the housing lead to other housing elements arranged at the housing such as, for example, outdoor bushings.

The contact arrangement advantageously also has at least one contact and at least one countercontact which are designed and arranged relative to one another in such a manner that they can be rotated with respect to one another about the longitudinal housing axis. The first electrical lead is then conductively connected to the contact and the second electrical lead is conductively connected to the countercontact. This makes it possible to avoid the situation where the rotation of the two housing halves with respect to one another is impeded in the case of a fixed connection of the electrical leads with the contact and the countercontact. The fixed connection of the electrical leads to the contact and the countercontact is advantageous especially with regard to the reliability of the electrical contact between contact and countercontact and electrical lead. If the contact and countercontact exhibit rotational symmetry with respect to the longitudinal housing axis, for instance cylindrical symmetry, and one concentrically surrounds the other one at least partially at a contact position representing an on position, a barrier-free rotation of contact and countercontact with respect to one another is possible and thus a barrier-free rotation of the two housing parts. This makes it possible, in particular, to rotate the two housing parts by up to 360° with respect to one another without rotation being impeded. In particular, the contact arrangement can comprise a rated-current contact arrangement with a rated-current contact, a rated-current countercontact and an arcing contact arrangement with an arcing contact and an arcing countercontact. The rated-current contact and the arcing contact in this arrangement display rotational symmetry with respect to the longitudinal housing axis and one surrounds the other one concentrically. Correspondingly, the rated-current countercontact and the arcing countercontact display rotational symmetry with respect to the longitudinal housing axis and one surrounds the other one concentrically.

In particular, the contact arrangement can be designed and arranged in such a manner that a contact closure or a contact separation can be produced by axially displacing the contact and/or the countercontact along the longitudinal housing axis.

Instead of designing the contact and the countercontact to be rotatable with respect to one another about the longitudinal housing axis, it is also possible that at least one of the electrical leads is electrically connected to the contact arrangement in such a manner that it can be rotated about the contact arrangement during a rotation of the two housing parts with respect to one another. The electrical contact between the contact arrangement and the electrical leads in this case can be ensured, for example, via sliding contacts.

In the heavy-duty circuit breaker according to the invention, the housing can be constructed, in particular, as a grounded metal capsule. In this case, the contact arrangement comprises an extinguishing system for extinguishing an arc. Such an embodiment makes it possible to use the heavy-duty circuit breaker according to the invention as a so-called "dead tank heavy-duty circuit breaker". So that the rotation of the two housing parts with respect to one another is not impeded by the extinguishing system, the latter can advantageously exhibit a rotational symmetry with respect to the longitudinal housing axis and can be arranged concentrically with respect to the contact arrangement. The heavy-duty circuit breaker according to the invention can be used as encapsulation module in a module arrangement for distributing electrical power in the high- and extra-high voltage range, if each housing part comprises at least one flange for flanging on further housing parts and the first electrical lead and the second electrical lead are in each case fed through a flange. Outdoor bushings, for example, can be flanged onto the flanges. By rotating the two housing parts relative to one another, an arrangement of the two outdoor bushings which is space saving with regard to the space available during installation of the heavy-duty circuit breaker can be produced. If the flanges are arranged in one circumferential plane of the housing, it is possible to arrange differently long outdoor bushings, by rotating the housing parts with respect to one another, in such a manner that their high-voltage connections are located on the same horizontal plane, for example with a horizontally aligned longitudinal housing axis. Different lengths of the outdoor bushings can occur if further elements, for example isolators/grounding electrodes are connected in front of some outdoor bushings.

Other features, characteristics and advantages of the present invention are obtained from the subsequent description of an exemplary embodiment, referring to the attached FIGURE.

BRIEF DESCRIPTION OF THE SEVERAL VIEWS OF THE DRAWING

The single FIGURE shows a module arrangement for high-voltage devices with a heavy-duty circuit breaker according to the invention.

DESCRIPTION OF THE INVENTION

The housing arrangement comprises a heavy-duty circuit breaker 1 according to the invention which has a grounded metallic encapsulation housing 3 with contact arrangement 5 arranged therein. The housing arrangement comprises, in particular, outdoor bushings 7 and isolator/grounding electrode 13 as further encapsulation modules.

The outdoor bushings 7 comprise semiconically constructed outdoor post insulators of ceramic material or another electrically insulating material through which a connecting lead 9 extends up to a terminal plate 11.

The connecting lead 9 is electrically conductively connected either directly or by interposition of an isolator/grounding electrode 13 and other connecting leads 15 to the contact arrangement 5.

The contact arrangement 5 is constructed rotationally symmetrically with respect to the longitudinal housing axis A of the coupling housing 3, which is horizontally aligned in the present exemplary embodiment. It comprises a direct-axis current contact 19 axially displaceable in the direction of the longitudinal housing axis A by means of a drive 17 and an arcing contact 21 also axially displaceable along the longitudinal housing axis A by means of the drive 17. A rated-current countercontact 23 and a rated-current countercontact 25 are arranged fixed in the coupling housing 3. A contact closure of the contact arrangement 5 can be produced by displacing the arcing contact 21 and the rated-current contact 19 in the direction of the fixed arcing countercontact 27 and the fixed rated-current countercontact 25. In the state of contact closure, the rated-current countercontact 25 surrounds the rated-current contact 19 concentrically. Similarly, the arcing countercontact 27 surrounds the arcing contact 21 concentrically. Arcing contact 21 and arcing countercontact 27 are also arranged concentrically within the rated-current contact 19 and the rated-current countercontact 25, respectively. All contacts and countercontacts are constructed rotationally symmetrically with respect to the longitudinal housing axis A.

In the encapsulation housing 3, an extinguishing system 29 is also arranged via which an arc produced during a switching-off process between the arcing contact 21 and the arcing countercontact 27 is blown with an extinguishing gas, for example sulfurhexafluoride ($SF_6$). The extinguishing system 29 also exhibits rotational symmetry with respect to the longitudinal housing axis A. The encapsulation housing 3 has a first housing part 31 and a second housing part 33. The two cylindrical housing parts 31, 33 are constructed so as to be rotatable with respect to one another about the longitudinal housing axis A. In the present exemplary embodiment, this is achieved by the first housing part 31 having a section 35 with reduced outside diameter, which is rotatably inserted in the second housing part 33. Between the two housing parts 31, 35, there is also a seal which seals the joint against the escape of extinguishing gas which is under high pressure.

Both the first housing part 31 and the second housing part 33 in each case have at least one flange 35, 37 arranged in a circumferential plane, via which an outdoor bushing 7 and a coupling encapsulation housing 41, respectively, are connected to the encapsulation housing 3 in the present exemplary embodiment. Due to the fact that the first flange 35 is arranged in the circumferential plane of the first housing part 31 and the second flange 37 is arranged in the circumferential plane of the second housing part 33, a rotation of the outdoor bushing 7 with respect to the outdoor bushings 7' can be produced by rotating the two housing parts with respect to one another. As a result, it can be achieved that (with a horizontal longitudinal housing axis A) the terminal plates 11 are all located in the same horizontal plane E in spite of different constructional lengths of the outdoor bushings with and without isolator/grounding electrode.

Due to the rotational symmetry of the contacts and countercontacts of the contact arrangement 5 and of the extinguishing system 29, the two housing parts 31, 33 can be rotated with respect to one another without the rotation being impeded by the contact arrangement 5 or the extinguishing system 29. In this case, the two housing halves 31, 33 can be rotated with respect to one another by an angle between 0 and 360°, in principle.

Rotating one housing part with respect to the other housing part by 180°, as is shown in the FIGURE, provides for a space-saving construction of the modules. Other constructional forms can be created by rotation by any angle (for example 90°) so that a demand-oriented and space-saving module arrangement can be achieved at any time.

Although the contacts and the countercontacts can be rotated with respect to one another about the longitudinal housing axis A in the exemplary embodiment shown, it is also possible to design the heavy-duty circuit breaker according to the invention in such a manner that the contacts 19, 21 of the contact arrangement 5 cannot be rotated about the longitudinal housing axis A with respect to the countercontacts 25, 27. In this case, the contact points 43, 45 at which the connecting leads 9 and 15 are in electrically conductive contact with the contact 19 and the countercontact, respectively, can be constructed in such a manner that they rotate about the outer surfaces of the contact and of the countercontact, respectively, when rotating the two housing parts with respect to one another. This can be achieved, for example, by sliding contacts.

The heavy-duty circuit breaker according to the invention enables module arrangements to be constructed in which all outdoor outputs (high-voltage connections of the outdoor bushings) are on the same plane in spite of the use of additional elements such as, for example, isolators/grounding electrodes. When the heavy-duty circuit breaker is used as part of a compact switching module, as is shown in the FIGURE, this leads to an optimal flat construction which has advantages for the plant construction, particularly for the busbar height and the outgoing feeder height.

In particular, the grounded coupling housing 3 can be implemented as a so-called "dead-tank housing" in which there is an insulating gas or extinguishing gas under a pressure of a few bar or into which such an insulating or extinguishing gas can be blown under a high pressure.

The invention claimed is:

1. A heavy-duty circuit breaker, comprising:
a housing having a longitudinal housing axis;
said housing having a first housing part and a second housing part connected to one another and rotatable relative to one another about said longitudinal housing axis, said first and second housing parts forming a grounded capsule;
a first electrical lead extending through said first housing part and a second electrical lead extending through said second housing part; and a contact arrangement disposed in said housing and conductively connected to said first and second electrical leads.

2. The heavy-duty circuit breaker according to claim 1, wherein said contact arrangement comprises at least one contact and at least one counter-contact configured and disposed relative to one another so as to be rotatable with respect to one another about said longitudinal housing axis, and wherein said first electrical lead is electrically conductively connected to said contact and said second electrical lead is electrically conductively connected to said counter-contact.

3. The heavy-duty circuit breaker according to claim 2, wherein said counter-contact is one of at least two counter-contacts disposed with rotational symmetry relative to said longitudinal housing axis and wherein one counter-contact surrounds the other counter-contact at least partially concentrically at a contact position representing an on position.

4. The heavy-duty circuit breaker according to claim 3, wherein said contact arrangement comprises a rated-current contact arrangement with a rated-current contact and a rated-current counter-contact and an arcing contact arrangement with an arcing contact and an arcing counter-contact, wherein said rated-current contact and said arcing contact are rotationally symmetric with respect to said longitudinal housing axis and one surrounds the other one concentrically and wherein said rated-current counter-contact and said arcing counter-contact are rotationally symmetric with respect to the longitudinal housing axis A and one surrounds the other one concentrically.

5. The heavy-duty circuit breaker according to claim 2, wherein said contact arrangement is configured such that a contact closure or a contact separation is effected by axially displacing at least one of said contact and said counter-contact along said longitudinal housing axis.

6. The heavy-duty circuit breaker according to claim 1, wherein at least one of said electrical leads is electrically connected to said contact arrangement for rotation about said contact arrangement when said first and second housing parts rotate with respect to one another.

7. The heavy-duty circuit breaker according to claim 1, wherein said contact arrangement forms an extinguishing system for extinguishing an arc.

8. The heavy-duty circuit breaker according to claim 7, wherein said extinguishing system is rotationally symmetric with respect to said longitudinal housing axis.

9. The heavy-duty circuit breaker according to claim 1, wherein each said first and second housing part comprises at least one flange for flanging on further housing parts and said first electrical lead and said second electrical lead are in each case fed through a respective said flange.

10. The heavy-duty circuit breaker according to claim 9, wherein said flanges are disposed in one circumferential plane of the housing.

11. A heavy-duty circuit breaker, comprising:
a housing having a longitudinal housing axis;
said housing having a first housing part and a second housing part connected to one another and rotatable relative to one another about said longitudinal housing axis;
a first electrical lead extending through said first housing part and a second electrical lead extending through said second housing part; and
a contact arrangement disposed in said housing and conductively connected to said first and second electrical leads; and
wherein each said first and second housing part comprises at least one flange for flanging on further housing parts and said first electrical lead and said second electrical lead are in each case fed through a respective said flange.

12. The heavy-duty circuit breaker according to claim 11, wherein said flanges are disposed in one circumferential plane of the housing.

* * * * *